(12) United States Patent
Krten

(10) Patent No.: US 11,222,096 B2
(45) Date of Patent: Jan. 11, 2022

(54) PROTECTING AN ITEM OF SOFTWARE

(71) Applicant: Irdeto B.V., Hoofddorp (NL)

(72) Inventor: Robert Krten, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 940 days.

(21) Appl. No.: 15/129,681

(22) PCT Filed: Mar. 28, 2014

(86) PCT No.: PCT/EP2014/056335
§ 371 (c)(1),
(2) Date: Sep. 27, 2016

(87) PCT Pub. No.: WO2015/144245
PCT Pub. Date: Oct. 1, 2015

(65) Prior Publication Data
US 2017/0154171 A1   Jun. 1, 2017

(51) Int. Cl.
*H04L 29/00* (2006.01)
*G06F 21/12* (2013.01)
*G06F 21/14* (2013.01)

(52) U.S. Cl.
CPC .......... *G06F 21/121* (2013.01); *G06F 21/125* (2013.01); *G06F 21/14* (2013.01);
(Continued)

(58) Field of Classification Search
CPC ................. G06F 21/121; G06F 21/125; G06F 2221/0735; G06F 2221/0737; G06F 21/50;
(Continued)

(56) References Cited

U.S. PATENT DOCUMENTS

| | | | |
|---|---|---|---|
| 6,526,456 B1 * | 2/2003 | Allan | G06F 21/125 705/59 |
| 2008/0189528 A1 * | 8/2008 | Robinson | G06F 11/2236 712/226 |
| 2009/0038008 A1 * | 2/2009 | Pike | G06F 21/52 726/22 |

FOREIGN PATENT DOCUMENTS

| | | |
|---|---|---|
| CN | 1224517 A | 7/1999 |
| CN | 1575445 A | 2/2005 |

(Continued)

OTHER PUBLICATIONS

Wikipedia, "Software verification and validation" website: https://en.wikipedia.org/w/index.php?title=Software_verification_and_validation&old . . . , obtained on Mar. 27, 2017, 4 pages.

(Continued)

*Primary Examiner* — Jeffrey C Pwu
*Assistant Examiner* — Helai Salehi
(74) *Attorney, Agent, or Firm* — Rimon PC; Marc Kaufman

(57) ABSTRACT

A method for securely executing an item of software. One or more security modules are executed by a computer and a computer executes the item of software. The execution of the item of software includes, at at least one point during execution of the item of software at which a predetermined function is to be performed, attempting to perform the predetermined function. The attempt to perform the predetermined function including sending, to an address system, a request for an address of instructions for carrying out the predetermined function, the request including an identifier of the predetermined function; receiving, from the address system in response to the request, an address generated by the address system based, at least in part, on (a) the identifier and (b) verification data provided to the address system from at least one of the one or more security modules; and (Continued)

continuing execution of the item of software at the address received from the address system.

28 Claims, 6 Drawing Sheets

(52) U.S. Cl.
CPC ................ *G06F 2221/0735* (2013.01); *G06F 2221/0737* (2013.01)

(58) Field of Classification Search
CPC ... G06F 21/57; G06F 21/60; H04L 29/06877; H04L 29/06884
See application file for complete search history.

(56) References Cited

FOREIGN PATENT DOCUMENTS

| | | |
|---|---|---|
| CN | 103198239 A | 7/2013 |
| WO | 02/06925 A2 | 1/2002 |
| WO | 2013116918 A1 | 8/2013 |
| WO | 2015/144245 A1 | 1/2015 |

OTHER PUBLICATIONS

Wikipedia, "Tamper resistance", https://en.wikipedia.org/w/index.php?title=Tamper_resistance&oldid=593233368, obtained on Feb. 12, 2016, 5 pages.

International Preliminary Report on Patentability issued in corresponding PCT Application No. PCT/EP2014/056335, dated Oct. 13, 2016, 9 pages.

International Search Report and Written Opinion cited in corresponding International Application No. PCT/EP2014/056335 dated Aug. 27, 2014.

Static Program Analysis retrieved from https://en.wikipedia.org/w/index.php?title=Static_program_analysis&oldid=599432774 on Sep. 22, 2016.

Chinese First Office Action received for Chinese Patent Application Serial No. 201480079326.6 dated Sep. 17, 2018, 25 pages (including English Translation).

European Patent Office, Communication Pursuant to Article 94(3) EPC for European Application No. EP14714676.5 dated Oct. 17, 2019.

* cited by examiner

PROTECTING AN ITEM OF SOFTWARE

The present application is the United States national stage of International Application No. PCT/EP2014/056335, filed Mar. 28, 2014, the entire content of which is incorporated herein by reference.

FIELD OF THE INVENTION

The present invention relates to a method for a computer to execute an item of software, a method for enabling a computer to execute an item of software, and apparatus and computer programs for carrying out such methods.

BACKGROUND OF THE INVENTION

It is well-known that attacks are often launched against items of software. The attacker may wish to obtain secret information contained within the item of software (such as a cryptographic key), with the aim of misusing that secret information (for example by distributing the cryptographic key to other people/systems so that those people/systems can use the cryptographic key in an unauthorised manner). Similarly, the attacker may wish to modify the execution flow of an item of software. For example, the item of software may have a decision point that checks whether a user of the item of software has certain permissions or access rights—if the user has those permissions or access rights then the item of software may grant the user access to certain functionality or data, otherwise such access is denied. The attacker may wish to try to modify the execution of the item of software at this decision point so that, even if the user does not have the permissions or access rights, the item of software still grants the user access to that certain functionality or data.

One of the tools or analysis techniques available to an attacker is the so-called "static program analysis"—for more information on this, see http://en.wikipedia.org/wiki/Static_program_analysis (the entire disclosure of which is incorporated herein by reference). WO2013/116918 (the entire disclosure of which is incorporated herein by reference) describes a method for helping protect an item of software against attacks that are based on static program analysis, as discussed below.

FIG. 5 of the accompanying drawings schematically illustrates how the method of WO2013/116918 operates. In particular, a computer 500 comprises a processor 510. An item of software 520 is to be executed by the processor 510. The item of software 520 is arranged to communicate with an address system 550. In FIG. 5, the address system 550 is shown as a separate entity from the computer 500, so that the address system 550 may communicate with the item of software 520 via a network (not shown in FIG. 5). However, the address system 550 may, instead, be a system (such as one or more computer programs or modules) executed by the same computer 500, so that the item of software 520 and the address system 550 may be software applications or modules or libraries executed by the processor 510.

The address system 550 of FIG. 5 is the so-called "trusted address server" of WO2013/116918.

Suppose that the code or instructions of an item of software comprise a program statement or command that causes execution of the item of software to jump from a current execution address to a different execution address. In particular, the program statement or command causes a predetermined function to be executed (or called or invoked or performed). As used herein, the term "function" shall be taken to mean any of a program function, a program procedure, a program subroutine, or any other block of code. The program statement or command may comprise an explicit procedure call or an explicit function call. The program statement or command may, instead, be any other operation or instruction (such as a GOTO statement) that causes execution of the item of software to jump from a current address to a new address (where instructions for the predetermined function exist). Normally, when a processor executes such an item of software and reaches a point in the item of software at which the predetermined function is to be executed, the program statement or command that calls or invokes the predetermined function causes the processor to continue execution of the item of software by having program execution jump to, and continue at, an address (or a location) of the instructions of the predetermined function—this can be handled, for example, using conventional call/execution stacks. With the method of WO2013/116918, however, the method for calling and executing the predetermined function is changed. In particular:

(a) In the item of software 520, the program statement or command that calls or invokes the predetermined function is replaced with replacement code that, when executed by the processor 510, causes an "address request" to be sent to the address system 550. The address request is a message that contains an identifier of the predetermined function (such as a unique identification code or some other number or tag or label or name associated with, and suitable for identifying, the predetermined function).

(b) The address system 550 comprises a database 560 (or a table or a list or some other data structure) that stores, for one or more identifiers, a corresponding address. The address system 550, upon receipt of the address request, searches the database 560 for a record corresponding to the identifier in the address request—thus, the address system 550 uses its database 560 to identify (or determine) an address corresponding to the identifier in the received address request. The address system 550 then returns the determined address to the item software 520.

(c) The replacement code in the item of software 520 is arranged so that, upon receipt of the determined address from the address system 550, execution of the item of software 520 continues at, or jumps to, the determined address.

With the above procedure, static program analysis is substantially more difficult, because an attacker cannot determine what function (or which set of instructions or code) will be executed by the replacement code (since the determined address at which execution continues is only provided to the item of software 520 by the address system 550 at runtime).

SUMMARY OF THE INVENTION

It would be desirable to provide improved resilience against attacks by an attacker.

According to a first aspect of the invention, there is provided a method for a computer to execute an item of software, the method comprising: the computer executing one or more security modules; the computer executing the item of software, said executing the item of software comprising, at at least one point during execution of the item of software at which a predetermined function is to be performed, attempting to perform the predetermined function by: sending, to an address system, a request for an address of instructions for carrying out the predetermined function, the request comprising an identifier of the predetermined function; receiving, from the address system in response to the request, an address generated by the address system based, at least in part, on (a) the identifier and (b) verification data provided to the address system from at least one of the one or more security modules; and continuing execution of the item of software at the address received from the address system.

In some embodiments, the method comprises the at least one of the one or more security modules providing the verification data to the address system in response to receiving a request for the verification data from the address system. Alternatively, in some embodiments, the method comprises the at least one of the one or more security modules providing the verification data to the address system periodically.

According to a second aspect of the invention, there is provided a method of facilitating execution of an item of software by a computer, the method comprising an address system performing the steps of: receiving, from the computer, a request for an address of instructions for carrying out a predetermined function of the item of software, the request comprising an identifier of the predetermined function; receiving, from at least one of one or more security modules being executed by the computer, verification data; generating an address based, at least in part, on (a) the identifier and (b) the verification data; providing the generated address to the computer for the computer to continue execution of the item of software at the provided address.

In some embodiments, the method comprises, in response to receiving the request for the address, sending, to the at least one of the one or more security modules, a request for the verification data. This method may further comprise identifying, based on the identifier, the at least one of the one or more security modules to which the request for the verification data is to be sent. Alternatively, in some embodiments, the method comprises receiving the verification data from the at least one of the one or more security modules periodically.

In some embodiments, generating the address comprises: generating a hash value by performing a hash based, at least in part, on the verification data; and combining the generated hash value with a predetermined compensation value to generate a result, wherein the address system stores the predetermined compensation value in association with the identifier; wherein the address is generated based on the result. The address may be a predetermined part of the result. The address may equal the result. In some embodiments, the method further comprises performing an error-detection operation on the result, and: if no errors are detected in the result, then the address is generated as at least part of the result; if at least one error is detected in the result, then the address is set to be a predetermined address. The predetermined address may be arranged such that continuing execution of the item of software at the predetermined address causes the item of software to perform at least one of: (a) ceasing execution of the item of software; (b) providing a notification to a provider of the item of software or to another entity; (c) preventing future execution of the item of software; (d) ensuring that data output by the item of software is corrupted. The notification may comprise data identifying the computer and/or a user of the computer. In some embodiments, the hash is further based, at least in part, on the identifier. In some embodiments, combining the generated hash value with the predetermined compensation value comprises XOR-ing the generated hash value with the predetermined compensation value.

In some embodiments of the first and second aspects of the invention, each of the one or more security modules is arranged to perform a respective security-related operation. The respective security-related operation may comprise one or more of: (a) software license processing in relation to the item of software; (b) preventing the item of software from executing on a device other than the computer; (c) authenticating the item of software; (d) authenticating a user of the item of software; (e) authorizing use of the item of software; (f) providing a countermeasure against an attack on the item of software; (g) detecting an attack on the item of software.

In some embodiments of the first and second aspects of the invention, the verification data comprises one or more values dependent on a current state of at least one of the one or more security modules.

In some embodiments of the first and second aspects of the invention, the verification data comprises a hash value based on a hash of one or more software portions, wherein each software portion is a respective part of the item of software or a respective part of one of the one or more security modules.

In some embodiments of the first and second aspects of the invention, the verification data comprises data representing one or more properties of the computer. The one or more properties of the computer may comprise one or both of: (a) an identification number for the computer; (b) a model type of the computer.

In some embodiments of the first and second aspects of the invention, the address system executes on the computer.

According to a third aspect of the invention, there is provided an apparatus arranged to carry out any one of the above-mentioned methods.

According to a fourth aspect of the invention, there is provided a computer program which, when executed by a processor, causes the processor to carry out any one of the above-mentioned methods. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
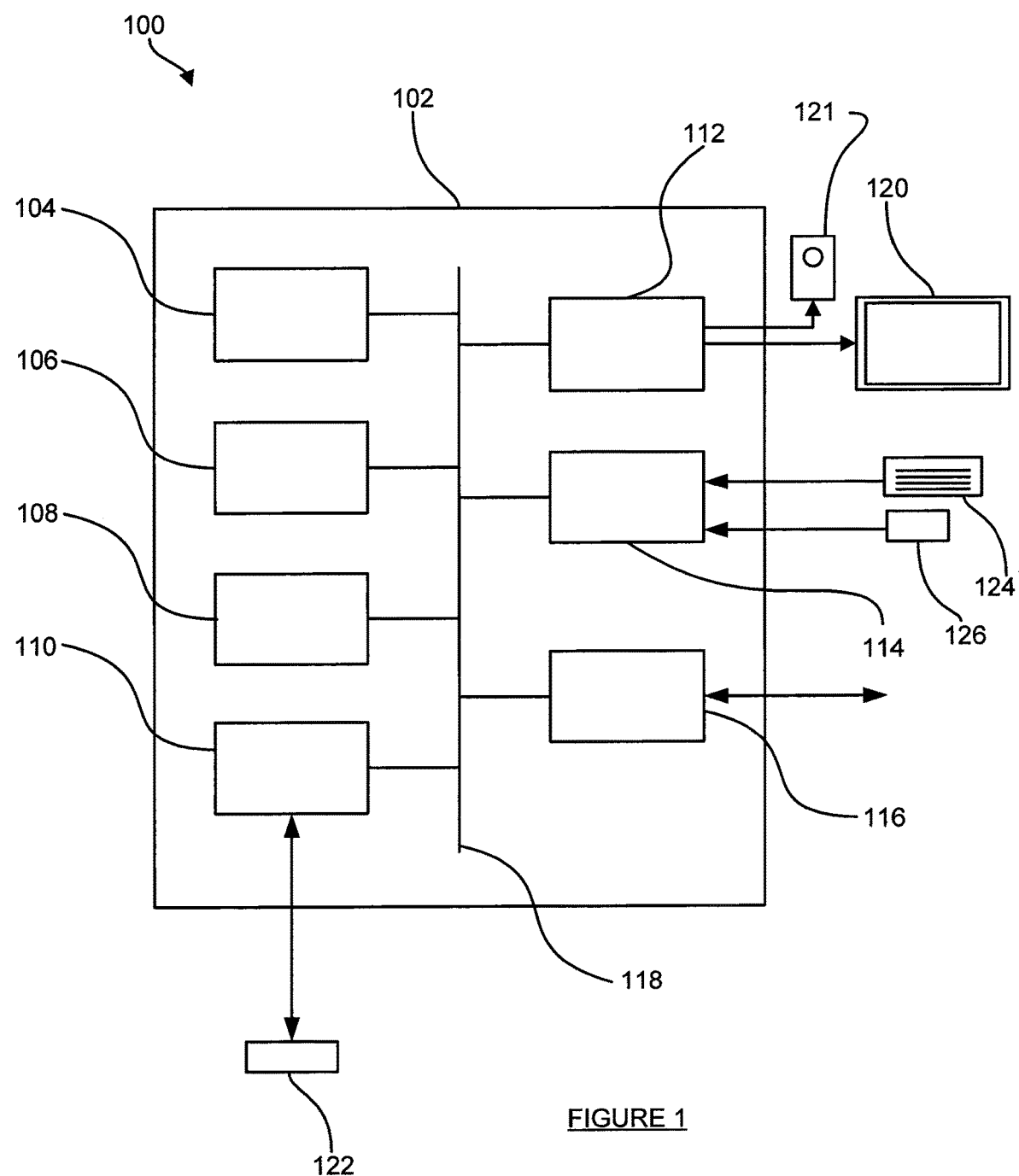
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
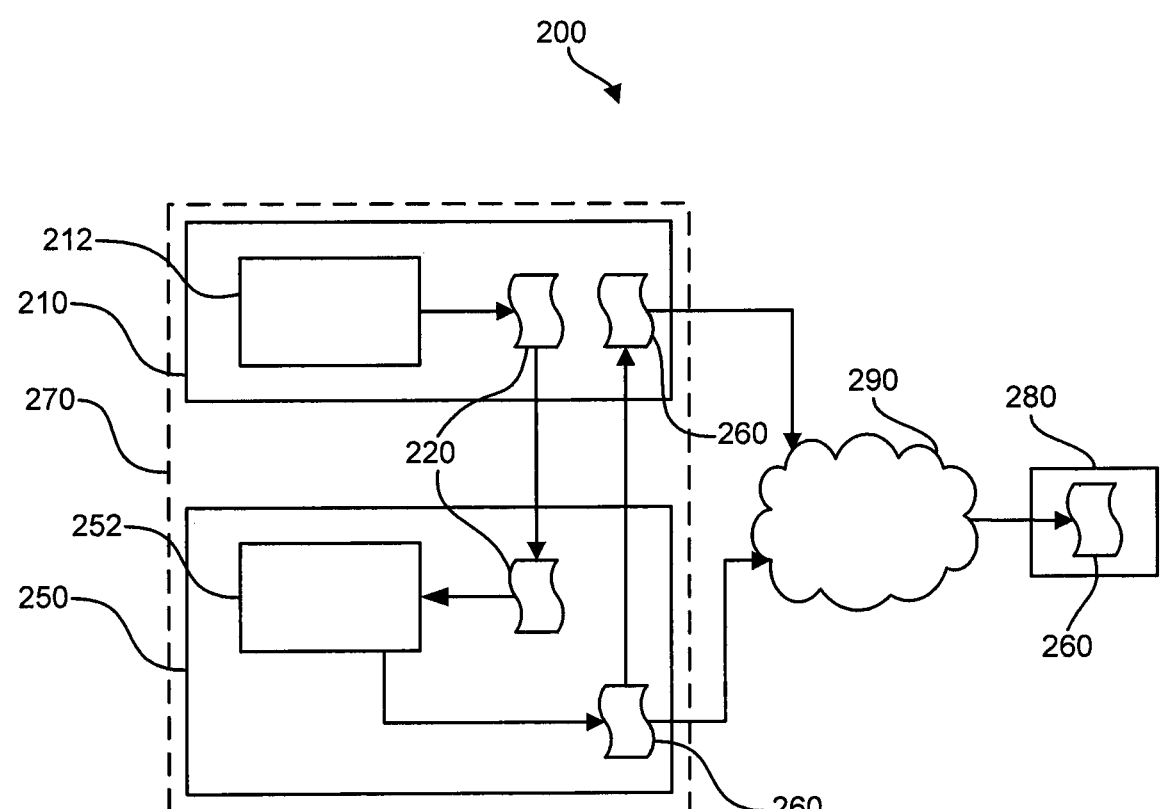
FIG. 2 schematically illustrates a system according to an embodiment of the invention.

FIG. 2 schematically illustrates a system 200 according to an embodiment of the invention. The system 200 comprises: a software generation system 210; a software protection system 250; a user system 280; and a network 290.

The software generation system 210 comprises (or executes or uses) a software generation tool 212 that generates an initial item of software 220. The software generation tool 212 may be, for example, a software application that a processor of the software generation system 210 executes. The software generation system 210 may be arranged to generate the initial item of software 220 autonomously; additionally or alternatively, the software generation system 210 may be arranged to generate the initial item of software 220 under the control of one or more software developers who write, at least in part, software code that forms part of the initial item of software 220. Tools for generating or developing an item of software are very well-known and shall, therefore, not be described in more detail herein.

The initial item of software 220 may comprise one or more of source code, object code, executable code and binary code. The initial item of software 220 may be programmed or written in one or more programming languages, which may comprise compiled programming languages and/or interpreted or scripted programming languages. The initial item of software 220 may comprise one or more modules or software components or computer programs, which may be presented or stored within one or more files. Indeed, the initial item of software 220 may be an entire software application, a software library, or the whole or a part of one or more software functions or procedures, or anywhere in-between (as will be appreciated by the person skilled in the art).

The initial item of software 220, when executed by a processor, is arranged to perform (or to cause the processor to perform) data processing based on one or more items of data. Each item of data could, respectively, be any type of data, such as audio data, video data, multimedia data, text data, financial data, one or more cryptographic keys, digital rights management data, conditional access data, etc. The data processing may comprise one or more of: (a) a decision based, at least in part, on at least one of the one or more items of data; (b) a security-related function; (c) an access-control function; (d) a cryptographic function; and (e) a rights-management function. However, it will be appreciated that the data processing may comprise one or more other types of functions or operations in addition to, or as an alternative to, the above examples. As one example, the data processing may relate to providing a user access to content (such as audio and/or video data) that is received and/or stored as encrypted content, where the user is provided access to the content only if the user has appropriate access permissions/rights. The one or more items of data may, therefore, comprise: the encrypted content; details about, or an identification of, the user and/or the user system 280; data specifying one or more permissions and/or rights; and one or more cryptographic keys (which could be stored as part of the initial item of software 220). Consequently, it is desirable to protect the initial item of software 220, so that an attacker cannot use the initial item of software 220 in an unauthorised manner to thereby gain access to the content even if the attacker is not authorised to access the content, i.e. to prevent the attacker bypassing the conditional access and/or digital rights management functionality provided by the initial item of software 220 (for example, by determining one or more decryption keys, or circumventing a decision point or branch point in the initial item of software 220 that relates to whether or not a user should be provided access to the content). It will be appreciated that there is, of course, other functionality that the initial item of software 220 could perform and/or other information that the initial item of software 220 uses for which it would (for similar or perhaps alternative reasons) be desirable to protect against an attacker. Consequently, as shown in FIG. 2, the initial item of software 220 is provided (or transferred or communicated) to the software protection system 250.

The software protection system 250 comprises (or executes or uses) a software protection tool 252. The software protection tool 252 may be, for example, a software application that a processor of the software protection system 250 executes. The software protection tool 252 is arranged to receive, as an input, the initial item of software 220. The software protection tool 252 generates a protected item of software 260 based on the received initial item of software 220. Methods by which the software protection tool 252 generates the protected item of software 260 shall be described later.

The software generation system 210 and the software protection system 250 may be run or operated by different entities. Thus, as shown in FIG. 2, the software protection system 250 may output the protected item of software 260 to the software generation system 210. With this model, the software protection system 250 provides a protection service to the software generation system 210. Alternatively, the software generation system 210 and the software protection system 250 may be run or operated by the same entity—indeed, the software generation system 210 and the software protection system 250 may form part of a single system (illustrated in FIG. 2 by the dashed line 270) that uses the software generation tool 212 to generate an initial item of software 220 and that uses the software protection tool 252 to protect that initial item of software 220 by generating a protected item of software 260.

Thus, the software generation system 210 and/or the software protection system 250 may output (or provide or communicate) the protected item of software 260 to the user system 280 via the network 290. It will be appreciated, however, that distribution of the protected item of software 260 may be performed by a different entity not shown in FIG. 2.

It will also be appreciated that the protected item of software 260 may undergo various additional processing after the protected item of software 260 has been generated by the software protection system 250 and before distribution to the user system 280. It will, therefore, be appreciated that in the follow description, references to distribution or use of the protected item of software 260 include distribution or use of the piece of software that results from applying the additional processing to the protected item of software 260. For example, the protected item of software 260 may need to be compiled and/or linked with other items of software (for instance if the protected item of software 260 is to form part of a larger software application that is to be distributed to the user system 280). However, it will be appreciated that such additional processing may not be required (for example if the protected item of software 260 is a final piece of JavaScript ready for distribution).

The network 290 may be any kind of data communication network suitable for communicating or transferring the protected item of software 260 to the user system 280. Thus, the network 290 may comprise one or more of: a local area network, a wide area network, a metropolitan area network, the Internet, a wireless communication network, a wired or cable communication network, a satellite communications network, a telephone network, etc. The software generation system 210 and/or the software protection system 250 may be arranged to communicate with the user system 280 via the network 290 via any suitable data communication protocol. Indeed, the protected item of software 260 may be provided to the user system 280 via a physical medium (such as being stored on one or more CDs or DVDs), so that the network 290 may then comprise a delivery system for physically delivering the physical medium to the user system 280.

The user system 280 is arranged to use the protected item of software 260, for example by executing the protected item of software 280 on one or more processors of the user system 280.

The user system 280 may be any system suitable for executing the protected item of software 280. Thus, the user system 280 may be one or more of: a personal computer, a laptop, a notepad, a tablet computer, a mobile telephone, a set top box, a television, a server, a games console, etc. The software protection system 250 and the software generation system 210 may, for example, comprise one or more personal computers and/or server computers. Thus, each of the user system 280, the software protection system 250 and the software generation system 210 may comprise one or more respective systems 100 as described above with reference to FIG. 1.

It will be appreciated that, whilst FIG. 2 illustrates the system 200 as comprising a single user device 280, a single software generation system 210, and a single software protection system 250, the system 200 may comprise multiple user devices 280 and/or multiple software generation systems 210 and/or multiple software protection systems 250.

Figure 3:
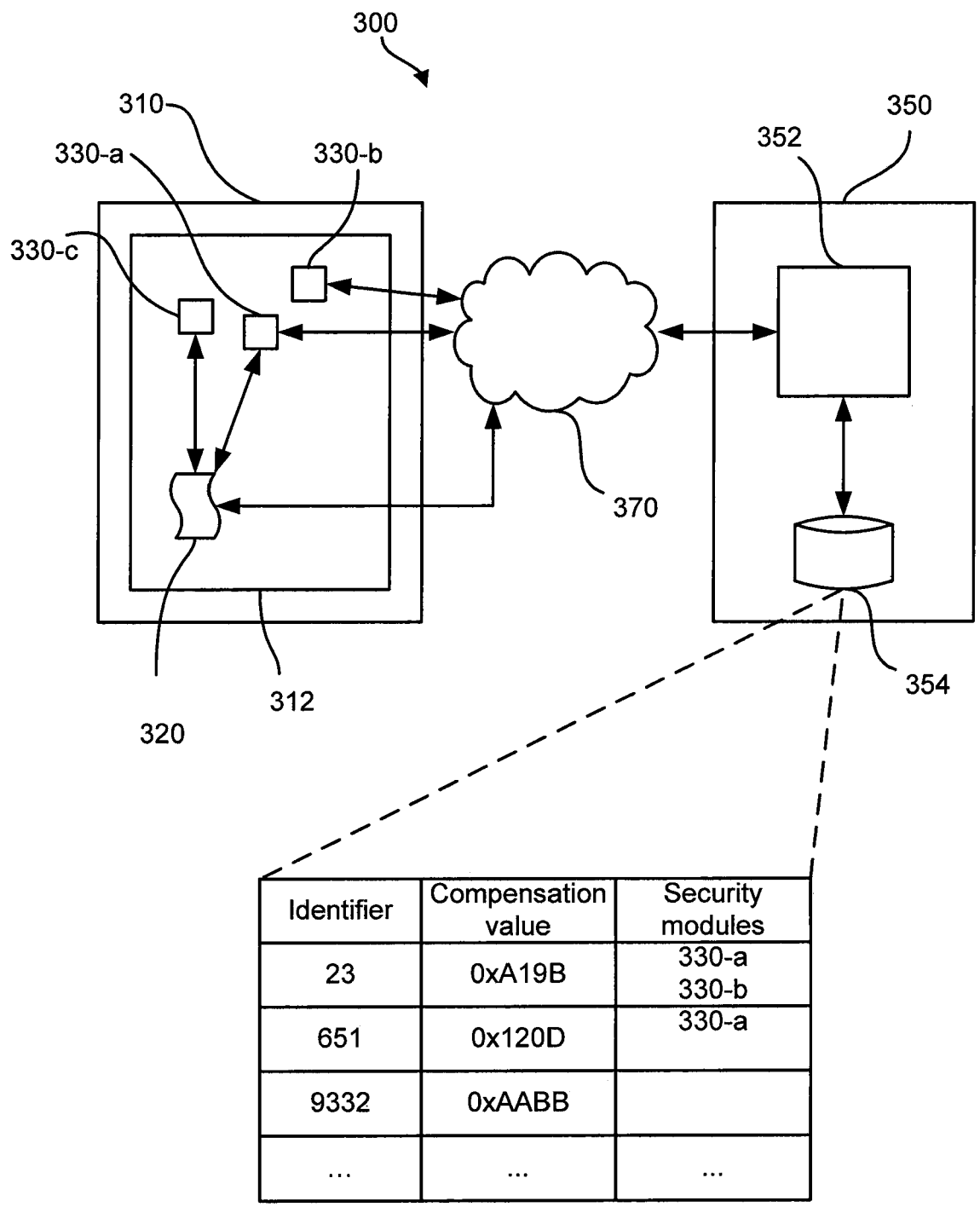
FIG. 3 schematically illustrates a system according to an embodiment of the invention.

FIG. 3 schematically illustrates a system 300 according to an embodiment of the invention. The system 300 comprises: a computer 310; an address system 350; and a network 370.

The computer 310 may be any data processing apparatus and may, therefore, be a computer system 100 as described above with reference to FIG. 1. The computer 310 comprises a processor 312. The processor 312 is arranged to execute an item of software 320 and one or more security modules 330. In FIG. 3, three security modules are illustrated (labelled 330-*a*, 330-*b* and 330-*c*)—it will, of course, be appreciated that any number of security modules 330 may be executed by the processor 310.

The item of software 320 may comprise one or more of source code, object code, executable code and binary code. The item of software 320 may be programmed or written in one or more programming languages, which may comprise compiled programming languages and/or interpreted or scripted programming languages. The item of software 320 may comprise one or more modules or software components or computer programs, which may be presented or stored within one or more files. Indeed, the item of software 320 may be an entire software application, a software library, or the whole or a part of one or more software functions or procedures, or anywhere in-between (as will be appreciated by the person skilled in the art).

Each security module 330 is an item of software that is arranged to perform (or cause the processor 312 to perform) a respective security-related operation in relation to the item of software 320. The security-related operation performed by a security module 330 may, for example, include one or more of: (a) software license processing in relation to the item of software 320; (b) preventing the item of software from executing on a device other than the computer 310 (i.e. node-locking functionality); (c) authenticating the item of software 320; (d) authenticating a user of the item of software 320; (e) authorizing use of the item of software 320; (f) providing a countermeasure against an attack on the item of software 320; and (g) detecting an attack on the item of software 320. It will, however, be appreciated that a security module 330 may be arranged to perform (or cause the processor 312 to perform) any other functionality to help protect the item of software 320 (such as any digital rights management or conditional access functionality). The above-mentioned security-related or protection operations are well-known and shall not, therefore, be described in more detail herein.

In some embodiments, one or more of the security modules 330 may be arranged to interact with the item of software 320—in FIG. 3, the security modules 330-a and 330-c are shown as interacting with the item of software 320. For example, the security module 330-a may be a software-licensing module and the item of software 320 may be arranged to cooperate with the software-licensing module 330-a to ensure that certain functionality of the item of software 320 is only provided to a user if the user had obtained a valid licence. In some embodiments, one or more of the security modules 330 may be arranged to not interact with the item of software 320—in FIG. 3, the security module 330-b is shown as not interacting with the item of software 320. For example, the security module 330-b may be a module that monitors whether a software debugger is being executed in relation to the item of software 320 and, if so, to consider this to be a possible attack against the item of software 320; as another example, the security module 330-b may be a module that determines, and outputs an indication of, an identity of the computer 310 or a model/type of the computer 310. Thus, the item of software 320 may be completely separate from one or more of the security modules 330; additionally, or alternatively, the item of software 320 may be linked with, or combined with, one or more of the security modules 330 (such as being part of the same software application). Again, as the operation/functioning of security modules 330 and their interaction (or, in some cases, non-interaction) with the item of software 320 is well-known, this shall not be described in more detail herein except where necessary to understand embodiments of the invention.

The item of software 320 is a protected item of software 260 prepared, and provided to the computer 310, as described above with reference to FIG. 2 (so that the computer 310 shown in FIG. 3 may be the same as the user system 280 shown in FIG. 2). The nature of the protection applied to, or afforded to, the item of software 320 shall become apparent from the discussion below. In some embodiments, one or more of the security modules 330 are provided to the computer 310 along with the item of software 320, for example, as a software suite or as modules or libraries of a software application. In some embodiments, one or more of the security modules 330 may already have been present on, or available to, the computer 310 prior to the computer 310 receiving the item of software 320.

In the system 300 of FIG. 3, the address system 350 is arranged to communicate with the computer 310 (or, more specifically, the item of software 320 and one or more of the security modules 330) via the network 370. The network 370 may be any kind of data communication network suitable for communicating data between the computer 310 and the address system 350. Thus, the network 370 may comprise one or more of: a local area network, a wide area network, a metropolitan area network, the Internet, a wireless communication network, a wired or cable communication network, a satellite communications network, a telephone network, etc. The computer 310 may be arranged to communicate with the address system 350 via the network 370 via any suitable data communication protocol.

The address system 350 comprises an address generation module 352 and a database 354. The address system 350 may comprise one or more computer systems (such as one or more of the computer systems 100 of FIG. 1). For example, the address system 350 may comprise one or more servers, in which case the address generation module 352 may comprise one or more computer programs or modules executed by one or more processors of the one one or more servers; the one or more servers may store the database 354 via any conventional means.

However, in some embodiments, the address system 350 may be part of the computer 310—for example, the address generation module 352 may comprise one or more computer programs or modules executed by the processor 312 of the computer 310, with the computer 310 storing the database 354 via any conventional means. In this embodiment, the system 300 does not need the network 370, as communication between the item of software 320 (and one or more of the security modules 330) and the address system 350 may take place internally within the computer 310.

The item of software 320 and the address system 350 operate together in a similar manner to that described above with reference to WO2013/116918. In particular:

Starting with the initial item of software 220, the initial item of software 220 (and the protected item of software 260, 320 too) comprises code or instructions for carrying out a predetermined function. This predetermined function may, when executed by the processor 310, be arranged to perform any desired functionality. As mentioned above, the term "function" shall be taken to mean any of a program function, a program procedure, a program subroutine, or any other block of code or instructions.

The code or instructions of the initial item of software 220 comprise a program statement or command that causes execution of the initial item of software 220 to jump from a current execution address to a different execution address. In particular, the program statement or command, when processed by a processor, causes the predetermined function to be executed (or called or invoked or performed). The program statement or command may comprise an explicit procedure call or an explicit function call. The program statement or command may, instead, be any other operation or instruction (such as a GOTO statement) that causes execution of the initial item of software 220 to jump from a current address to a new address (where code or instructions for the predetermined function exist).

The software protection tool 252 is arranged to generate the protected item of software 260, 320 in the same manner as in WO2013/116918. In particular, the software protection tool 252 replaces the program statement or command in the initial item of software 220 that calls or invokes the predetermined function with replacement code that, when executed by the processor 310, causes an "address request" to be sent to the address system 350. The address request is a message that contains an identifier of the predetermined function (such as a unique identification code or some other number or tag or label or name associated with, and suitable for identifying, the predetermined function). The content of the message may be solely the identifier.

The replacement code is also arranged so that, upon receipt of an address from the address system 350, execution of the protected item of software 260, 320 continues at, or jumps to, the received address.

Therefore, any of the methods and techniques described in WO2013/116918 for forming/implementing the replacement code, and for including the replacement code into the initial item of software 220 to generate the protected item of software 260, 320, may be used by the software protection tool 252.

Embodiments of the invention differ from WO2013/116918 at least in how the address is generated by the address system 350.

The above description has been set out with respect to a particular predetermined function of the initial item of software 220 and a particular call to that predetermined function. It will, of course, be appreciated that the above description (and the following description) can be applied to multiple separate calls to the predetermined function and, indeed, can be applied in respect of multiple different predetermined functions.

2—Generation of an Address by the Address System

Figure 4A:
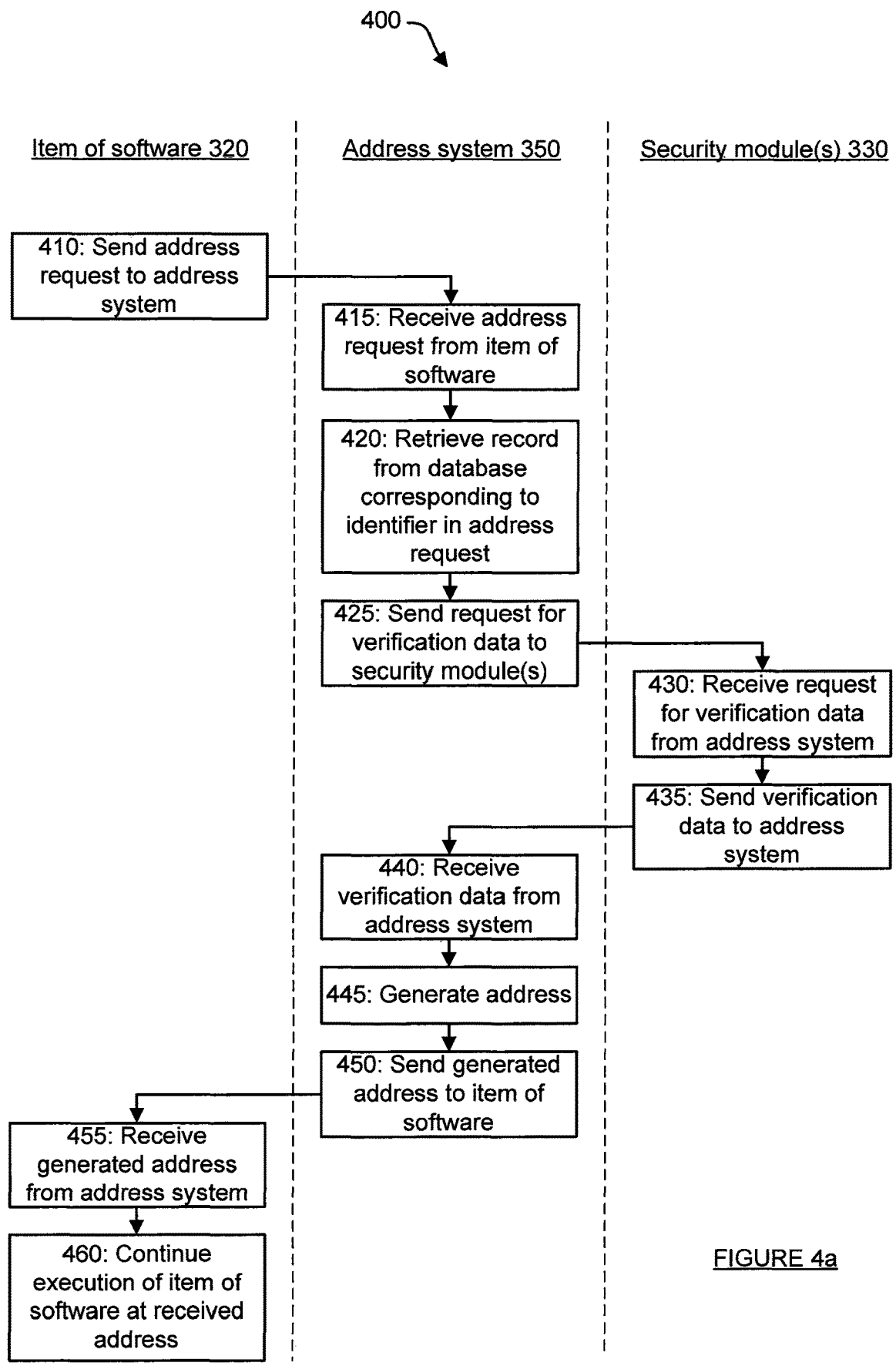
FIG. 4a is a flowchart schematically illustrating a method of operating the system of FIG. 3 according to an embodiment of the invention.

FIG. 4a is a flowchart schematically illustrating a method 400 of operating the system 300 according to an embodiment of the invention.

As mentioned above, at a step 410, during execution of (i.e. at runtime of) the item of software 320, the item of software 320 sends an address request to the address system 350. The address request comprises an identifier for a predetermined function of the item of software 320 whose execution is now desired at the current stage of execution of the item of software 320.

At a step 415, the address generation module 352 of the address system 350 receives the address request from the item of software 320.

At a step 420, the address generation module 352 retrieves, from the database 354, a data record corresponding to the identifier contained in the address request, i.e. the address generation module 352 uses the identifier in the address request as an index into the database 354 to retrieve a corresponding data record.

FIG. 3 illustrates an example structure for the data records held/stored in the database 354. It will, of course, be appreciated that other structures could be used instead to achieve the same functionality as discussed below.

Each data record stored in the database 354 corresponds to a respective identifier. As each identifier corresponds to a respective function in the item of software 320, each data record stored in the database 354 effectively corresponds to a respective function in the item of software 320. As shown in FIG. 3, the data record corresponding to an identifier stores, in association with that identifier, a "compensation value". The nature and purpose of the compensation value shall be described shortly. The data record may, optionally, comprise one or more further fields or amounts of data. For example, as shown in FIG. 3, one or more of the data records may store an identification of one or more of the security modules 330.

In some embodiments, the step 420 simply comprises the address generation module 352 retrieving, from the database 354, one or more fields from the data record that corresponds to the identifier contained in the address request—for example, the step 420 may simply comprise the address generation module 352 retrieving, from the database 354, the compensation value that corresponds to the identifier contained in the address request.

At a step 425, the address system 350 (or the address generation module 352) sends a request to one or more of the security modules 330. The request(s) sent to one or more of the security modules 330 are requests for "verification data". The nature and purpose of "verification data" shall be described shortly.

In some embodiments, a request for verification data is sent to all of the security modules 330 that are executing on the computer 310. In alternative embodiments, a request for verification data is sent to a subset of the security modules 330 that are executing on the computer 310. The particular set of security module(s) 330 to which a request for verification data is sent may be predetermined, i.e. a default set of security module(s) 330 may be used. The particular set of security module(s) 330 to which a request for verification data is sent may be independent of the identifier in the address request. Alternatively, in some embodiments (as shown in FIG. 3), the record in the database 354 that corresponds to the identifier in the address request may store an identification of one or more of the security modules 330, and it is these identified security module(s) 330 to which a request for verification data is sent; if the record in the database 354 that corresponds to the identifier in the address request does not identify any security modules 330, then the request for verification data may be sent to the predetermined/default set of security module(s) 330.

Therefore, at a step 430, one or more of the security modules 330 receives a request for verification data.

At a step 435, each of the one of more security modules 330 that received a request for verification data at the step 430 returns (or sends or provides) respective verification data to the address system 350. For this, one or more of the security modules 330 may need to generate its respective verification data. The verification data output by a security module 330 may comprise one or more verification values, as described below.

In some embodiments, a verification value generated and output by a security module 330 may be dependent on a current "state" of at least one of the one or more security modules 330. This verification value may be dependent on a current state of a different security module 330 (in which case the security module 330 that is outputting the verification value may be viewed as "monitoring" the state of the other security module 330); additionally or alternatively, this verification value may be dependent on a current state of the security module 330 that is outputting the verification value.

The state of a security module 330 may relate to the current operation conditions for the security module 330, for example: whether the security module 330 is operating as normal/expected or whether one or more errors have occurred (or are occurring); whether the security module 330 now has a current licence or an expired licence; a version of the security module 330; the operation of the security module 330 may be viewed as a finite state machine, in which case the state of the security module 330 may be an indication of the current state in the finite state machine; etc. The state of a security module 330 may relate to the security-related functionality of the security module 330, for example: if the security-related functionality involves checking or monitoring the item of software 320 (and potentially itself and/or other security modules 330) for potential attacks being carried out, then the state of the security module 330 may be indicative of whether or not an attack has been detected; if the security-related functionality involves an authorization or authentication operation, then the state of the security module 330 may relate to whether authorization or authentication has failed at some point, or a number of failed authorization or authentication attempts within a given period of time; if the security-related functionality involves checking that one or more other security modules 330 are executing, then the state of the security module 330 may relate to whether or not those one or more other security modules 330 are indeed executing; etc.

It will be appreciated that there are numerous other possible states for a security module 330.

If a security module 330 is arranged to output (or provide) a verification value that is dependent on a current state of at least one of the one or more security modules 330, then the security module 330 is arranged to set the verification value as follows. If the state(s) upon which the verification value is to depend are all currently normal/expected/legitimate states, e.g. states that would be expected if the computer 300 were executing the item of software 320 with no attacks being (or having been performed) and all security modules 320 are executing properly and up-to-date, then the verification value is set to be a predetermined value. If, however, one or more of the state(s) upon which the verification value is to depend is not currently a normal/expected/legitimate state (for example, a licence has expired, or an attack has been detected, or a particular security module 330 that is meant to be executing is not actually executing), then the security module 330 is arranged to set the verification value so that it is a value other than the above predetermined value. The verification value shall be a "correct" verification value if it is the predetermined value; otherwise, it shall be an "incorrect" verification value. Thus, the address system 330 only receives the correct verification value when the computer 300 is operating in a safe/expected unattacked manner.

The predetermined value may be any value. Different security modules 330 may use different predetermined values.

In a similar manner, in some embodiments, a verification value generated and output by a security module 330 may be dependent on a current "state" of the item of software 320.

In some embodiments, a verification value generated and output by a security module 330 may be (or may be based on) a (cryptographic) hash of one or more software portions, wherein each software portion is a respective part of the item of software 320 or a respective part of a respective one of the one or more security modules 330. The "part" may be the whole of the item of software 320 or the whole of the respective security module 330. Hashes are well-known and shall not, therefore, be described in detail herein. However, in summary: a hash is an algorithm that generates a hash value, which is a value of fixed length (i.e. a fixed number of bits) that is derived by the hash from a quantity of input data (which may be of arbitrary size); the hash is arranged so that even a small change to the quantity of input data results in a significant change in the hash value; the hash is arranged so that is infeasible to determine a quantity of input data that would result in a particular hash value; the hash is usually based, or seeded, by a cryptographic key. Thus, for example, one of the security modules 330 may be arranged to calculate a hash value, using a hashing function, where the input to the hash comprises one or more predetermined parts from the item of software 320 and/or from one or more of the security modules 330. These predetermined parts may relate to functionality that an attacker may wish to attack (e.g. by an attacker replacing a portion of the item of software 320 or a portion of a security module 330 with replacement code/instructions) and, therefore, for which it is desirable to check whether a modification has been made to one or more of the predetermined parts. If the predetermined parts have not been modified, then the security module 330 that is generating the hash value will generate a hash value that corresponds to the original/correct code/instructions in those predetermined parts—the resulting verification value shall be referred to herein as a "correct" verification value. On the other hand, if one or more of the predetermined parts have been modified, then the security module 330 that is generating the hash value will generate a hash value that does not correspond to the original/correct code/instructions in those predetermined parts—the resulting verification value shall be referred to herein as an "incorrect" verification value.

In some embodiments, a verification value generated and output by a security module 330 may be (or may be based on) data representing one or more properties of the computer 310, such as (a) an identification number for the computer 310 and/or (b) a type or model of the computer 310. The security module 330 may, therefore, be arranged to determine these one or more properties of the computer 310. The item of software 320 may have been intended for execution on a specific computer 310—thus, if the verification value is based on an identification number for the computer 310, then (a) if the item of software 320 is executing on the originally intended specific computer 310, then the verification value will be a "correct" verification value; otherwise (b) if the item of software 320 is not executing on the originally intended specific computer 310, then the verification value will not be the "correct" verification value and will, therefore, be an "incorrect" verification value. Additionally, or alternatively, the item of software 320 may have been intended for execution on a specific type or model of computer 310 (e.g. a particular model of mobile telephone, or the item of software 320 should be executed on desktop computers and not tablets or mobile devices, etc.)—thus, if the verification value is based on a model or type of the computer 310, then (a) if the item of software 320 is executing on the originally intended model or type of computer 310, then the verification value will be a "correct" verification value; otherwise (b) if the item of software 320 is not executing on the originally intended model or type of computer 310, then the verification value will not be the "correct" verification value and will, therefore, be an "incorrect" verification value.

It will, of course, be appreciated that other verification data, comprising other types of verification value, may be generated and output by a security module 330. In general, the verification value is a "correct" verification value if it is the value that the provider of the item of software 320 (or some other entity, such as the operator of the address system 350) expects to receive under normal (or correct/valid/authorized) operating conditions; otherwise, the verification value is an "incorrect" verification value, which indicates that the item of software item 320 may not be executing under normal (or correct/valid/authorized) operating conditions.

At a step 440, the address system 350 receives verification data from one or more of the security modules 330.

Thus, as described above, the address system 350 receives verification data from one or more security modules 330 in response the address system 350 requesting verification data from those one or more security modules 330. However, in an alternative embodiment, one or more (and potentially all) of the security modules 330 may be arranged to provide verification data to the address system 350 periodically, in which case the address system 350 does not send a request for verification data to such a security module 330 (and, therefore, the steps 425 and 430 are omitted, at least in respect of that security module 330). Naturally, if the address system 350 has not yet received such periodic verification data from a security module 330, then the address system 350 may still be arranged to send a request for verification data to that security module 330.

At a step 445, the address generation module 352 of the address system 350 generates an address, based on the verification data received at the step 440 and on the compensation value retrieved (or obtained) at the step 420. Methods for doing this shall be described shortly.

At a step 450, the address generation module 352 of the address system 350 provides (or sends or outputs) the generated address to the item of software 320.

At a step 455, the item of software 320 receives the generated address from the address system 350.

At a step 460, the processor 312 continues execution of the item of software 320 at the address received at the step 455.

We turn, then, to methods by which the address is generated at the step 445. In the following, let the verification value(s) in the verification data received at the step 440 be represented by $V_1, \ldots, V_n$ (where $n \geq 1$), and let the compensation value retrieved at the step 420 be represented by C. Then the address generation module 352 uses a function F to generate an address A based on $V_1, \ldots, V_n$ and C, i.e. $A = F(V_1, \ldots, V_n, C)$. The compensation value C is chosen so that, if all of the verification values $V_1, \ldots, V_n$ are correct verification values, then the resulting address A is the address of the instructions for the predetermined function of the item of software 320 that is desired to be executed, whereas if one or more of the verification values $V_1, \ldots, V_n$ are incorrect verification values, then the resulting address A is not (or is at least very unlikely to be) the address of the instructions for the predetermined function of the item of software 320 that is desired to be executed.

As an example, the function F may involve:
(i) Generating a first value H based on the verification values $V_1, \ldots, V_n$. For example, the first value H may be a hash value generated by performing one or more hashes on the set of verification values $V_1, \ldots, V_n$. It will, however, be appreciated that other functions could be used to generate the first value H from the verification values $V_1, \ldots, V_n$ (e.g. XOR-ing the verification values $V_1, \ldots, V_n$ together or multiplying the verification values $V_1, \ldots, V_n$ together or performing some polynomial combination of the verification values $V_1, \ldots, V_n$, or some combination of any of the above, etc.). The first value H may be based one or more other data values too, such as the identifier received in the address request. For example, the first value H may be a hash value generated by performing one or more hashes on the set of verification values $V_1, \ldots, V_n$ together with the identifier.

(ii) Combining the first value H with the compensation value C to generate a result value R, using a combination function W, i.e. $R = W(H, C)$. The combination function W is preferably chosen so that, given a target result value R' and a particular first value H', a compensation value C' can be identified so that $R' = W(H', C')$. As an example, the function W may involve XOR-ing the first value H with the compensation value C, so that $R = H \oplus C$. As another example, $R = W(H, C) = H + C$. It will be appreciated that other combination functions W could be used in a similar manner.

(iii) The address A may then be identified as the whole or a part of the result value R. For example, the address A may be b bits (e.g. the first b bits) taken from the result value R, where b is the bit-size of the address to be output by the address system 350. The purpose of the compensation value C is that when the verification values $V_1, \ldots, V_n$ are all correct verification values, the resulting first value H is adjusted by the compensation value C so as to achieve a result value R from which the address A is obtainable. The compensation value C is also secret data that the attacker does not know, which makes it harder for an attacker to successfully attack the item of software 320.

It will, however, be appreciated that other functions F for generating the address A may be used. In some embodiments, the compensation value is optional—in particular, the values for the correct verification values may be set so that address A is derivable directly (e.g. as a whole or a part) of the above-mentioned first value H.

Thus, the generation of the address is based, at least in part, on the verification data obtained from one or more of the security modules 330.

Similarly, the generation of the address is based, at least in part, on the identifier in the address request (for example, due to the address system 350 identifying, based on the identifier, the security module(s) 330 to which a request for verification data is to be sent and/or due to the address system 350 obtaining the compensation value associated with the identifier).

Thus, if all of the verification values $V_1, \ldots, V_n$ received are correct verification values, then normal execution of the item of software 320 continues, insofar as the execution of the item of software 320 resumes at the code/instructions for the desired predetermined function. Likewise, if one or more of the verification values $V_1, \ldots, V_n$ received is an incorrect verification value, then normal execution of the item of software 320 does not continue, because the address returned to the item of software 320 at the step 450 is not the correct address for the code/instructions for the desired predetermined function.

In some embodiments, the result value R comprises the address A encoded according to an error-correction code or an error-detection code. For example, the result value R may comprise the address A and a cyclic-redundancy-check value. The step 445 may, therefore, comprise generating the result value R and performing an error-detection operation (based on the error-correction code or the error-detection code) on the result value R. If no errors are detected, then the address A is obtained from the result value R as set out above; if an error is detected, then the address generation module 352 now knows that one or more of the verification values $V_1, \ldots, V_n$ is an incorrect verification value and the address generation module 352 may, therefore, be arranged to set the address to be returned to the item of software 320 to a predetermined address. This predetermined address may, for example, be arranged such that continuing execution of the item of software 320 at the predetermined address causes the item of software 320 to perform at least one of:

(a) Ceasing execution of the item of software 320—for example, the predetermined address may be an address of a function in the item of software 320 which terminates (potentially gracefully) the execution of the item of software 320.

(b) Providing a notification to a provider of the item of software 320 or to another entity—for example, the predetermined address may be an address of a function in the item of software 320 causes such a notification to be output. This notification may, for example, comprise data identifying the computer 310 and/or a user of the computer 310, to thereby facilitate tracking or identification of the attacker.

(c) Preventing future execution of the item of software 320—for example, the predetermined address may be an address of a function which causes one or more important items of code or data for the item of software 320 to be deleted;

(d) Ensuring that data output by the item of software 320 is corrupted—for example, execution of the item of software 320 at the predetermined address may cause the item of software 320 to modify one or more data values and/or perform one or more operational steps that corrupt data output by the item of software 320 (thereby rendering the item of software 320 useless to the attacker).

In some embodiments, if a security module 330 fails to provide verification data in response to a request from the address generation module 352, then any (a) verification values expected back from that security module 330 may be set to predetermined incorrect values and/or (b) the address generated at the step 445 may be set to be the above-mentioned predetermined address.

Figure 4B:
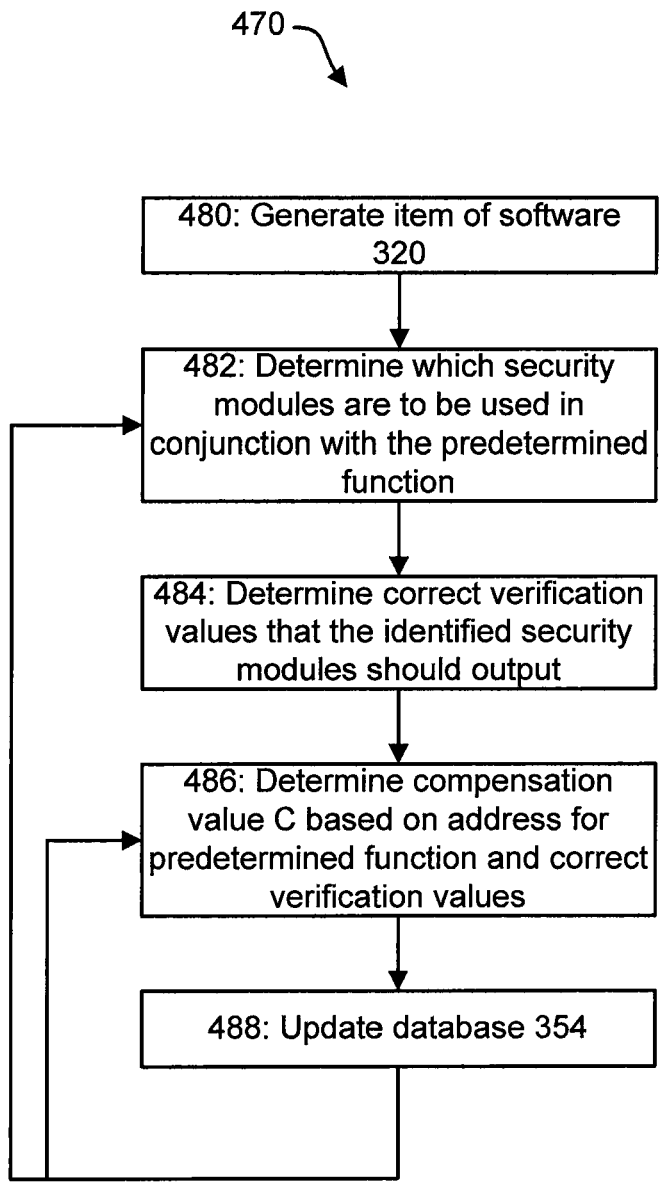
FIG. 4b is a flowchart schematically illustrating a method of configuring an address system according to an embodiment of the invention.
Figure 5:
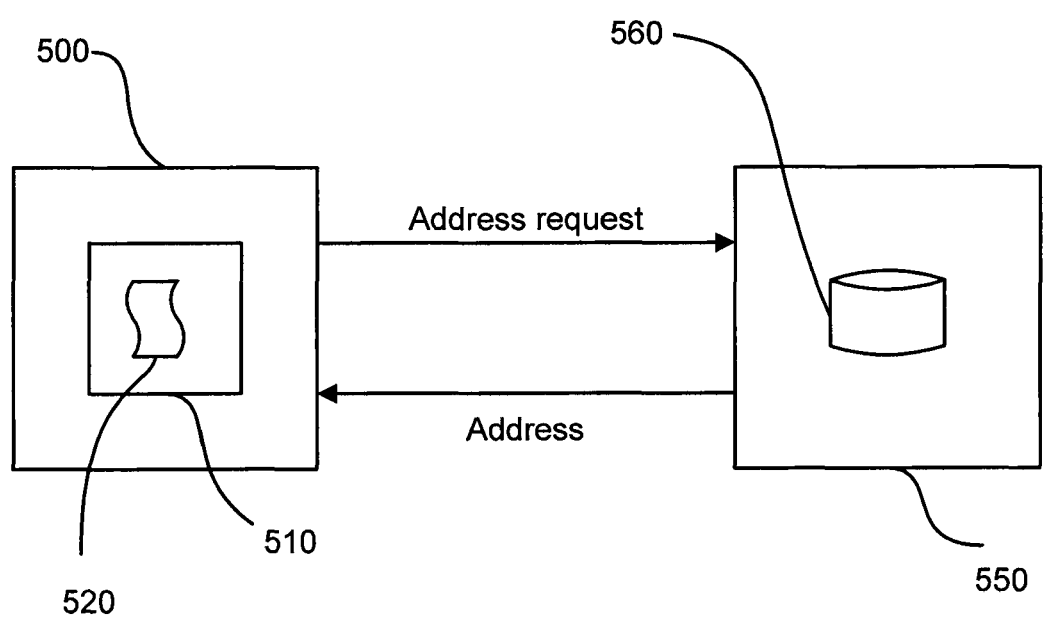
FIG. 5 schematically illustrates how the method of WO2013/116918 operates.

FIG. 4b is a flowchart schematically illustrating a method 470 of configuring the address system 350 according to an embodiment of the invention. The method 470 is performed for each predetermined function in the item of software 320 for which a call to that predetermined function is to be protected in the manner set out above.

At a step 480, the item of software 320 is generated, as discussed above. At this stage, the item of software 320 may be in a form ready for distribution to an end user, i.e. to the computer 310. Thus the subsequent steps of the method 470 may be performed at a very late stage, e.g. after the item of software 320 has been compiled, linked and bound. This makes embodiments of the invention particularly flexible and easy to incorporate into the software production chain.

At a step 482, a determination is made as to which of the one or more security modules 330 (that are to be executed by the computer 310) should be involved, or used in conjunction with, the predetermined function, i.e. which of the security modules 330 should be used to provide verification data for the steps 425, 430, 435 and 440 of FIG. 4a. This decision may be based on any criteria (such as what security modules 330 will actually be available at the computer 310, what types of security-related functions should be checked or performed when determining whether execution of the predetermined function should be allowed, etc.) Thus, one or more security modules 330 are identified.

At a step 484, the correct verification value(s) that the identified security modules 330 should output is/are determined. For example, if an identified security module 330 is to output a verification value based on the state of a particular security module 330 or a state of the item of software 320, then the verification value that indicates that the state of the particular security module 330 or the state of the item of software 320 is a normal state may be identified. This could be, for example, a predetermined value associated with the security module 330. Similarly, if a security module 330 is to output a verification value based on a hash of one or more portions of code, then as those one or more portions of code will be available in an "unattacked"/"safe" context, the correct verification value can be determined by performing the hash. Similarly, if a security module 330 is to output a verification value based on one or more properties of the computer 310, the verification value can be determined based on the actual values for the one or more properties for a target computer 310.

At a step 486, the compensation value C for this predetermined function may be determined, based on the address in the item of software 320 for the predetermined function and the determined correct verification values. As set out above, the compensation value C is chosen so that, if all of the verification values $V_1, \ldots, V_n$ received at the step 440 are correct verification values, then the address A that results from calculating $A=F(V_1, \ldots, V_n, C)$ is the correct address of the instructions for the predetermined function of the item of software 320. In the example above in which the address A is determined from result value R, where $R=H \oplus C$, then: (a) a target value R' for the result value R can be chosen so that A is obtainable from the target value R'; (b) a correct value H' for the value H can be determined based on the identified correct verification values; and (c) one can set the compensation value C to be $C=R' \oplus H'$. Naturally, if the compensation value C is used in a different way at the step 445 of FIG. 4a, then the compensation value C may be determined in a correspondingly different way at the step 486 of FIG. 4b.

At a step 488, the database 354 is updated. In particular, a record is included in the database 354 that stores the compensation value C in association with the identifier that the item of software 320 will use (in the address request) for the predetermined function. The record may also store an identification of the one or more security modules 330 that were identified at the step 482.

As shown in FIG. 4b, the method 470 may comprise, after performing the step 488, returning to the step 486. For example, the item of software 320 may comprise multiple predetermined functions and one can change or select which predetermined function will be executed in response to an address request that has a particular identifier by changing the compensation value in the record in the database 354 for that particular identifier. Thus, if it is desired to arrange the item of software 320 to change from executing a first predetermined function to executing a second predetermined function, then one simply needs to calculate a new compensation value C that would result in the address system 350 generating the address for the second predetermined function, and then update the record in the database 354 with the new compensation value C.

As shown in FIG. 4b, the method 470 may comprise, after performing the step 488, returning to the step 482. In particular, it may be desirable to change the selection of one or more security modules 330 made at the step 482—for example, this could be due to updates in the security modules 330, inclusion of new security modules 330 to be used, and removal of a security module 330 from the computer 300 (or stopping reliance on a security module 330 at the computer 300).

The method 470 may be performed by an operator of the address system 350. This operator may be an entity that uses the software protection tool 252 to generate the item of software 320, or it may be a different entity.

3—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps as described above may each be implemented by corresponding respective modules; multiple method steps may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for a computer to execute an item of software, the method comprising:
   the computer executing one or more security modules;
   the computer executing the item of software, said executing the item of software comprising, at at least one point during execution of the item of software at which a predetermined function is to be performed, attempting to perform the predetermined function by:
   sending, to an address system, a request message for an address of instructions for carrying out the predetermined function, the request message comprising an identifier of the predetermined function;
   receiving, from the address system in response to the request message, an address generated by the address system based, at least in part, on (a) the identifier and (b) verification data provided to the address system from at least one of the one or more security modules; and
   continuing execution of the item of software at the address received from the address system;
   wherein the verification data comprises a hash value based on a hash of one or more software portions, wherein each software portion is a respective part of the item of software or a respective part of one of the one or more security modules.

2. The method of claim 1, comprising the at least one of the one or more security modules providing the verification data to the address system in response to receiving a request for the verification data from the address system.

3. The method of claim 1, comprising the at least one of the one or more security modules providing the verification data to the address system periodically.

4. The method of claim 1, in which each of the one or more security modules is arranged to perform a respective security-related operation.

5. The method of claim 1, in which the verification data comprises one or more values dependent on a current state of at least one of the one or more security modules.

6. The method of claim 1, in which the verification data comprises data representing one or more properties of the computer.

7. The method of claim 1, in which the address system executes on the computer.

8. The method of claim 4, wherein the respective security-related operation comprises one or more of:
   (a) software license processing in relation to the item of software;
   (b) preventing the item of software from executing on a device other than the computer;
   (c) authenticating the item of software;
   (d) authenticating a user of the item of software;
   (e) authorizing use of the item of software;
   (f) providing a countermeasure against an attack on the item of software;
   (g) detecting an attack on the item of software.

9. The method of claim 6, in which the one or more properties of the computer comprises one or both of: (a) an identification number for the computer; (b) a model type of the computer.

10. A method of facilitating execution of an item of software by a computer, the method comprising an address system performing the steps of:
    receiving, from the computer, a request message for an address of instructions for carrying out a predetermined function of the item of software, the request message comprising an identifier of the predetermined function;

receiving, from at least one of one or more security modules being executed by the computer, verification data;

generating an address based, at least in part, on (a) the identifier and (b) the verification data;

providing the generated address to the computer for the computer to continue execution of the item of software at the provided address;

wherein the method further includes at least one of:
(i) in response to receiving the request message for the address, sending, to the at least one of the one or more security modules, a request for the verification data and identifying, based on the identifier, the at least one of the one or more security modules to which the request for the verification data is to be sent;
(ii) wherein generating the address comprises:
   generating a hash value by performing a hash based, at least in part, on the verification data; and
   combining the generated hash value with a predetermined compensation value to generate a result, wherein the address system stores the predetermined compensation value in association with the identifier;
   wherein the address is generated based on the result; or
(iii) wherein the verification data comprises a hash value based on a hash of one or more software portions, wherein each software portion is a respective part of the item of software or a respective part of one of the one or more security modules.

11. The method of claim 10, comprising receiving the verification data from the at least one of the one or more security modules periodically.

12. The method of claim 10, wherein the address is a predetermined part of the result.

13. The method of claim 10, wherein the address equals the result.

14. The method of claim 10, comprising performing an error-detection operation on the result, and:
   if no errors are detected in the result, then the address is generated as at least part of the result;
   if at least one error is detected in the result, then the address is set to be a predetermined address.

15. The method of claim 10, in which the hash is further based, at least in part, on the identifier.

16. The method of claim 10, wherein combining the generated hash value with the predetermined compensation value comprises XOR-ing the generated hash value with the predetermined compensation value.

17. The method of claim 10, in which each of the one or more security modules is arranged to perform a respective security-related operation.

18. The method of claim 10, in which the verification data comprises one or more values dependent on a current state of at least one of the one or more security modules.

19. The method of claim 10, in which the verification data comprises data representing one or more properties of the computer.

20. The method of claim 10, in which the address system executes on the computer.

21. The method of claim 14, wherein the predetermined address is arranged such that continuing execution of the item of software at the predetermined address causes the item of software to perform at least one of:
   (a) ceasing execution of the item of software;
   (b) providing a notification to a provider of the item of software or to another entity;
   (c) preventing future execution of the item of software;
   (d) ensuring that data output by the item of software is corrupted.

22. The method of claim 17, wherein the respective security-related operation comprises one or more of:
   (a) software license processing in relation to the item of software;
   (b) preventing the item of software from executing on a device other than the computer;
   (c) authenticating the item of software;
   (d) authenticating a user of the item of software;
   (e) authorizing use of the item of software;
   (f) providing a countermeasure against an attack on the item of software;
   (g) detecting an attack on the item of software.

23. The method of claim 19, in which the one or more properties of the computer comprises one or both of: (a) an identification number for the computer; (b) a model type of the computer.

24. The method of claim 21, wherein the notification comprises data identifying the computer and/or a user of the computer.

25. An apparatus comprising a processor, the processor arranged to execute an item of software by:
   executing one or more security modules;
   executing the item of software, said executing the item of software comprising, at at least one point during execution of the item of software at which a predetermined function is to be performed, attempting to perform the predetermined function by:
      sending, to an address system, a request message for an address of instructions for carrying out the predetermined function, the request message comprising an identifier of the predetermined function;
      receiving, from the address system in response to the request message, an address generated by the address system based, at least in part, on (a) the identifier and (b) verification data provided to the address system from at least one of the one or more security modules; and
      continuing execution of the item of software at the address received from the address system; and
   wherein the verification data comprises a hash value based on a hash of one or more software portions, wherein each software portion is a respective part of the item of software or a respective part of one of the one or more security modules.

26. An apparatus comprising a processor, the processor arranged to facilitate execution of an item of software by a computer by:
   receiving, from the computer, a request message for an address of instructions for carrying out a predetermined function of the item of software, the request message comprising an identifier of the predetermined function;
   receiving, from at least one of one or more security modules being executed by the computer, verification data;
   generating an address based, at least in part, on (a) the identifier and (b) the verification data;
   providing the generated address to the computer for the computer to continue execution of the item of software at the provided address;
   wherein the processor is arranged perform at least one of:
   (i) in response to receiving the request message for the address, sending, to the at least one of the one or more security modules, a request for the verification data and identifying, based on the identifier, the at least one of the one or more security modules to which the request for the verification data is to be sent;
(ii) wherein generating the address comprises:
generating a hash value by performing a hash based, at least in part, on the verification data; and
combining the generated hash value with a predetermined compensation value to generate a result, wherein the address system stores the predetermined compensation value in association with the identifier;
wherein the address is generated based on the result; or
(iii) wherein the verification data comprises a hash value based on a hash of one or more software portions, wherein each software portion is a respective part of the item of software or a respective part of one of the one or more security modules.

27. A non-transitory computer-readable medium storing a computer program which, when executed by one or more processors, causes the one or more processors to:
execute one or more security modules;
execute the item of software, execution of the item of software comprising, at at least one point during execution of the item of software at which a predetermined function is to be performed, attempting to perform the predetermined function by:
sending, to an address system, a request message for an address of instructions for carrying out the predetermined function, the request message comprising an identifier of the predetermined function;
receiving, from the address system in response to the request message, an address generated by the address system based, at least in part, on (a) the identifier and (b) verification data provided to the address system from at least one of the one or more security modules; and
continuing execution of the item of software at the address received from the address system; and
wherein the verification data comprises a hash value based on a hash of one or more software portions, wherein each software portion is a respective part of the item of software or a respective part of one of the one or more security modules.

28. A non-transitory computer-readable medium storing a computer program which, when executed by one or more processors, causes the one or more processors to facilitate execution of an item of software by a computer by:
receiving, from the computer, a request message for an address of instructions for carrying out a predetermined function of the item of software, the request message comprising an identifier of the predetermined function;
receiving, from at least one of one or more security modules being executed by the computer, verification data;
generating an address based, at least in part, on (a) the identifier and (b) the verification data;
providing the generated address to the computer for the computer to continue execution of the item of software at the provided address;
wherein the computer program, when executed by one or more processors, causes the one or more processors to perform at least one of:
(i) in response to receiving the request message for the address, sending, to the at least one of the one or more security modules, a request for the verification data and identifying, based on the identifier, the at least one of the one or more security modules to which the request for the verification data is to be sent;
(ii) wherein generating the address comprises:
generating a hash value by performing a hash based, at least in part, on the verification data; and
combining the generated hash value with a predetermined compensation value to generate a result, wherein the address system stores the predetermined compensation value in association with the identifier;
wherein the address is generated based on the result; or
(iii) wherein the verification data comprises a hash value based on a hash of one or more software portions, wherein each software portion is a respective part of the item of software or a respective part of one of the one or more security modules.

\* \* \* \* \*